US008823739B2

(12) United States Patent
Baron, Jr. et al.

(10) Patent No.: US 8,823,739 B2
(45) Date of Patent: Sep. 2, 2014

(54) BACKGROUND REPLACEMENT FOR VIDEOCONFERENCING (75) Inventors: Rudolf C. Baron, Jr., Marietta, GA (US); Andrew R. Jones, Round Rock, TX (US); Michael L. Massimi, South Hamilton, MA (US); Kevin C. McConnell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 12/868,109

(22) Filed: Aug. 25, 2010

(65) Prior Publication Data
US 2012/0050323 A1 Mar. 1, 2012

(51) Int. Cl.
*G09G 5/00* (2006.01)

(52) U.S. Cl.
USPC .......................................................... 345/632

(58) Field of Classification Search
USPC .......................................................... 345/632
See application file for complete search history.

(56) References Cited

U.S. PATENT DOCUMENTS

| 5,812,787 | A * | 9/1998 | Astle ............................ 709/247 |
| 7,011,629 | B2 * | 3/2006 | Bulat ........................... 600/300 |
| 7,337,146 | B2 * | 2/2008 | Heelan et al. ................... 705/52 |
| 7,612,794 | B2 | 11/2009 | He et al. |
| 2003/0194131 | A1 * | 10/2003 | Zhao et al. .................... 382/190 |
| 2004/0005084 | A1 * | 1/2004 | Kondo et al. .................. 382/107 |
| 2004/0012613 | A1 | 1/2004 | Rast |
| 2004/0075749 | A1 * | 4/2004 | Kondo et al. ............. 348/222.1 |
| 2008/0030621 | A1 | 2/2008 | Ciudad et al. |
| 2008/0077953 | A1 | 3/2008 | Fernandez et al. |
| 2008/0133345 | A1 * | 6/2008 | Cordery et al. ................. 705/14 |
| 2008/0140785 | A1 * | 6/2008 | Farrenkopf et al. ............ 709/206 |
| 2008/0298571 | A1 * | 12/2008 | Kurtz et al. .................... 379/156 |
| 2008/0303949 | A1 * | 12/2008 | Ciudad et al. .................. 348/586 |
| 2009/0079813 | A1 * | 3/2009 | Hildreth ...................... 348/14.03 |
| 2009/0287790 | A1 | 11/2009 | Upton et al. |
| 2009/0315915 | A1 * | 12/2009 | Dunn et al. .................... 345/632 |
| 2009/0324023 | A1 | 12/2009 | Tian et al. |
| 2011/0249074 | A1 * | 10/2011 | Cranfill et al. .............. 348/14.02 |

FOREIGN PATENT DOCUMENTS

| JP | 04326389 A | * 11/1992 | ............. G09B 15/00 |
| WO | 2009035198 A1 | 3/2009 | |

OTHER PUBLICATIONS

Zhang et al., "Light Weight Background Blurring for Video Conferencing Applications", Microsoft Research, 4 pages, http://research.microsoft.com/en-us/um/people/lhe/papers/icip06.blurr.pdf, 2006.

Eliot Phillips, "Hack a Day", Copyright 2010, 10 pages, http://hackaday.com/2009/01/29/pseudo-3d-chat/.

Ahmed et al., "Automatic Video Background Replacement Using Shape-Based Probabilistic Spatio-Temporal Object Segmentation", ICICS 2007, Copyright 2007 IEEE, 4 pages.

* cited by examiner

*Primary Examiner* — Edward Martello
(74) *Attorney, Agent, or Firm* — Matthew Chung; Hoffman Warnick LLC (57) ABSTRACT A solution for managing a videoconference is provided. Multiple virtual backgrounds can be stored, and a virtual background can be selected to be used for a first participant when he/she is conducting a videoconference with a second participant. The virtual background can be selected based on one or more attributes of the first and/or second participant, one or more attributes of the videoconference, and/or the like. The virtual backgrounds can be utilized, for example, to provide a desired perception, message, and/or the like, of a business entity to individuals outside of the business entity that are interacting with its personnel via videoconferencing.

20 Claims, 5 Drawing Sheets

BACKGROUND REPLACEMENT FOR VIDEOCONFERENCING

TECHNICAL FIELD

The disclosure relates generally to videoconferencing, and more particularly, to managing the display of a virtual background during videoconferencing.

BACKGROUND

The use of videoconferencing is ever expanding, particularly in light of the trend for corporate employees to be working at a mobile work location away from a traditional office, and the increasing speed and affordability of sufficiently fast cameras, networks, computer systems, etc. However, when an employee is located in a non-traditional work location, such as a home office, vacation location, etc., the background of the video feed for the employee can become distracting to other videoconference participants and/or project an undesirable image to a current or prospective customer of the employer.

A current approach to address these issues is to selectively locate the video conference camera and/or configure the background so that the background is innocuous. For example, the person can sit in front of a blank wall, a hanging sheet, and/or the like. Another approach uses image processing to blur portions of the image that correspond to the background.

In various applications, such as news reporting, image data corresponding to the individual is isolated from background image data, which is replaced with image data for another background. Various approaches can identify and separate an individual's face and/or torso from a background without requiring a fixed background of a unique color (e.g., a green screen). For example, an approach uses generic shape-based probabilistic spatio-temporal video object segmentation to isolate an individual from the actual background and merge the individual with a desired background.

BRIEF SUMMARY

Aspects of the invention provide a solution for managing a videoconference. Multiple virtual backgrounds can be stored, and a virtual background can be selected to be used for a first participant when he/she is conducting a videoconference with a second participant. The virtual background can be selected based on one or more attributes of the first and/or second participant, one or more attributes of the videoconference, and/or the like.

A first aspect of the invention provides a computer-implemented method of managing a videoconference, the method comprising: configuring display of a first videoconference participant to a second videoconference participant of the videoconference using a computer system, the configuring including: selecting a first virtual background for the first videoconference participant from a plurality of virtual backgrounds based on at least one of: a first videoconference participant identification or a second videoconference participant identification by applying a set of virtual background selection rules to the at least one of: the first videoconference participant identification or the second videoconference participant identification using the computer system; and providing the first virtual background from the computer system for display to the second videoconference participant in conjunction with isolated video data corresponding to the first videoconference participant isolated from an actual background of the first videoconference participant during the videoconference.

A second aspect of the invention provides a computer system comprising: a set of computing devices configured to manage a video conference by performing a method comprising configuring display of a first videoconference participant to a second videoconference participant of the videoconference, the configuring including: selecting a first virtual background for the first videoconference participant from a plurality of virtual backgrounds based on at least one of: a first videoconference participant identification or a second videoconference participant identification by applying a set of virtual background selection rules to the at least one of: the first videoconference participant identification or the second videoconference participant identification; and providing the first virtual background for display to the second videoconference participant in conjunction with isolated video data corresponding to the first videoconference participant isolated from an actual background of the first videoconference participant during the videoconference.

A third aspect of the invention provides a computer program comprising program code embodied in at least one computer-readable medium, which when executed, enables a computer system to implement a method of managing a videoconference, the method comprising: configuring display of a first videoconference participant to a second videoconference participant of the videoconference by performing a method comprising: selecting a first virtual background for the first videoconference participant from a plurality of virtual backgrounds based on at least one of: a first videoconference participant identification or a second videoconference participant identification by applying a set of virtual background selection rules to the at least one of: the first videoconference participant identification or the second videoconference participant identification; and providing the first virtual background for display to the second videoconference participant in conjunction with isolated video data corresponding to the first videoconference participant isolated from an actual background of the first videoconference participant during the videoconference.

A fourth aspect of the invention provides a method of generating a computer system, the method comprising: providing a computer system configured to manage a videoconference by performing a method comprising configuring display of a first videoconference participant to a second videoconference participant of the videoconference, the configuring including: selecting a first virtual background for the first videoconference participant from a plurality of virtual backgrounds based on at least one of: a first videoconference participant identification or a second videoconference participant identification by applying a set of virtual background selection rules to the at least one of: the first videoconference participant identification or the second videoconference participant identification; and providing the first virtual background for display to the second videoconference participant in conjunction with isolated video data corresponding to the first videoconference participant isolated from an actual background of the first videoconference participant during the videoconference.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention provide a solution for managing a videoconference. Multiple virtual backgrounds can be stored, and a virtual background can be selected to be used for a first participant when he/she is conducting a videoconference with a second participant. The virtual background can be selected based on one or more attributes of the first and/or second participant, one or more attributes of the videoconference, and/or the like. The virtual backgrounds can be utilized, for example, to provide a desired perception, message, and/or the like, of a business entity to individuals outside of the business entity that are interacting with its personnel via videoconferencing. As used herein, unless otherwise noted, the term "set" means one or more (i.e., at least one) and the phrase "any solution" means any now known or later developed solution.

Figure 1:
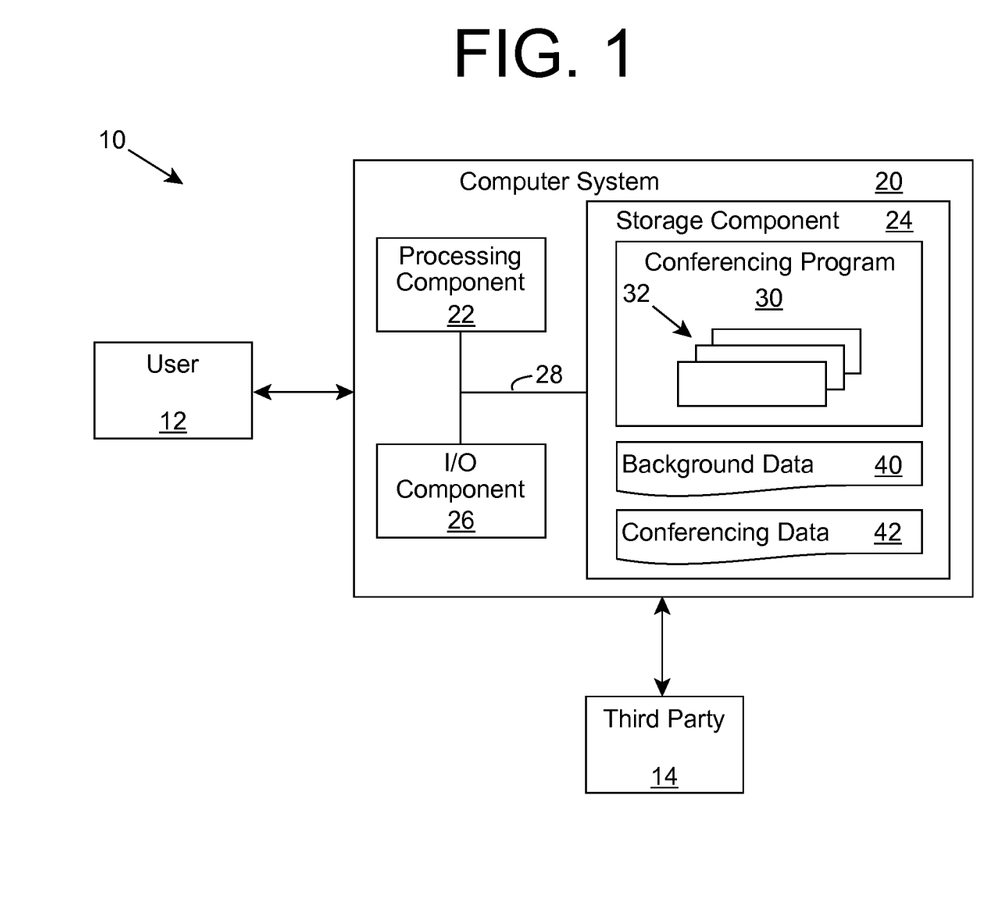
FIG. 1 shows an illustrative environment for managing a videoconference according to an embodiment.

Turning to the drawings, FIG. 1 shows an illustrative environment 10 for managing a videoconference according to an embodiment. To this extent, environment 10 includes a computer system 20 that can perform a process described herein in order to manage a videoconference between a user 12 and one or more third parties 14. In particular, computer system 20 is shown including a conferencing program 30, which makes computer system 20 operable to manage the videoconference by performing a process described herein. As used herein, user 12 and third party 14 can refer to a computing device being used by an individual or to an individual interacting with environment 10.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as conferencing program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, conferencing program 30 can manage a set of interfaces (e.g., graphical user interface(s), application program interface, and/or the like) that enable human and/or system users 12 to interact with conferencing program 30. Further, conferencing program 30 can manage (e.g., store, retrieve, create, manipulate, organize, present, etc.) the data, such as background data 40, using any solution.

In any event, computer system 20 can comprise one or more general purpose computing articles of manufacture (e.g., computing devices) capable of executing program code, such as conferencing program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, conferencing program 30 can be embodied as any combination of system software and/or application software.

Further, conferencing program 30 can be implemented using a set of modules 32. In this case, a module 32 can enable computer system 20 to perform a set of tasks used by conferencing program 30, and can be separately developed and/or implemented apart from other portions of conferencing program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of conferencing program 30 fixed thereon (e.g., one or more modules 32). However, it is understood that computer system 20 and conferencing program 30 are only representative of various possible equivalent computer systems that may perform a process described herein. To this extent, in other embodiments, the functionality provided by computer system 20 and conferencing program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems, such as user 12 and/or third party 14, using any type of communications link. In either case, the communications link can comprise any combination of various types of wired and/or wireless links; comprise any combination of one or more types of networks; and/or utilize any combination of various types of transmission techniques and protocols.

As discussed herein, conferencing program 30 enables computer system 20 to manage some or all of a videoconference between a user 12 and a third party 14. To this extent, computer system 20 can configure the display of a first video conference participant, such as user 12, to one or more other video conference participants, such as third party 14. In an illustrative embodiment used to describe various aspects of the invention further, the user 12 works for a business entity, while the third party 14 does not work for the business entity. Computer system 20 can manage background data 40 corresponding to the business entity, which can include multiple virtual backgrounds to be utilized in conjunction with the video conferencing of its personnel. The virtual backgrounds can correspond to various desired perceptions/messages that the business entity wants to project to individuals outside of the business entity. Additionally, the virtual backgrounds can correspond to the business conducted by the business entity. To this extent, the background data 40 can comprise virtual backgrounds that comprise static image data (e.g., a corporate logo), a live or recorded video feed (e.g., of a wind farm managed by the business entity), a static or non-static web page of the business entity (e.g., describing a new product or services offered by the business entity), and/or the like.

Each virtual background can be pre-approved for use during a videoconference conducted by personnel of the business entity, for example, by a manager of the entity. To this extent, computer system 20 can manage a set of interfaces that enable personnel to request approval of virtual backgrounds for use in conducting videoconferences. For example, an individual can use computer system 20 to propose a static image, a set of presentation slides, recorded video, a link to a live video feed, a web page, a web address, and/or the like, which he/she would like to use as a virtual background during an upcoming videoconference. Computer system 20 can provide the proposed virtual background for review by a manager and receive an approval or denial for use of the proposed virtual background, which the computer system 20 can communicate to the requesting individual. In the case that the proposed virtual background is approved, the virtual background can be stored as background data 40 for future use in a videoconference.

A virtual background can be approved for a limited number of uses (e.g., only during a particular videoconference), a limited amount of time (e.g., during the next week), for only certain personnel, and/or the like. To this extent, the background data 40 can include approval information, which enables computer system 20 to ensure that a particular virtual background can continue to be used by the personnel of the business entity. In an embodiment, all approvals can have a default time period for which they are valid, and after which continued use of the virtual background requires re-approval, e.g., to ensure that current messaging of the business entity is being utilized. Regardless, when approval of a virtual background is indicated as having expired, the computer system 20 can present the virtual background for review by a manager, who can re-approve the virtual background or remove approval of the virtual background. In the latter case, the virtual background will no longer be able to be used by any personnel of the business entity and computer system 20 can remove the virtual background and any associated data from the background data 40.

The background data 40 also can include a set of virtual background selection rules, which computer system 20 can use to select one of the various virtual backgrounds for use in conjunction with one or more personnel of the business entity as they participate in videoconferences. The set of background selection rules can be associated with one or more attributes of the videoconference. For example, a rule can designate a preferred virtual background for use in conjunction with a particular employee and/or type of employee (e.g., sales, executive, business development, and/or the like), a particular customer and/or type of customer, an employee/customer combination, one or more attributes of the employee and/or customer, a subject matter of the videoconference, and/or the like. The set of background selection rules can comprise a hierarchical order to automatically select an appropriate background when multiple virtual backgrounds are appropriate. To this extent, a rule that is more specific to one or more attributes of the video conference (e.g., designated subject matter versus any subject matter, both participants versus single participant) can comprise a higher priority than a less specific rule (e.g., any potential customer).

When setting up a videoconference, a user 12 can provide conferencing data 42, which can comprise various attributes of the videoconference and/or the participants of the videoconference for processing by computer system 20. For example, the user 12 can provide identification information for the user 12, one or more third parties 14, a subject matter of the videoconference, a time/date for the videoconference, and/or the like, using any solution (e.g., a graphical user interface presented by computer system 20). In an embodiment, the user 12 can enter some or all of the conferencing data 42 in a calendaring system, and computer system 20 can obtain the information from a calendar invitation for the videoconference. Computer system 20 also can obtain additional identification information regarding a third party 14, which computer system 20 can utilize to select a virtual background and/or manage the videoconference. For example, computer system 20 can access a customer profile corresponding to the identified third party 14, user 12 can provide additional identification information, and/or the like. The additional identification information can include, for example, a geographic location, current/new customer, Internet protocol (IP)/Mac address information, the participant's name/position, the corresponding business entity's name, etc.

In any event, computer system 20 can apply the set of virtual background selection rules to the conferencing data 42 to select one or more virtual backgrounds for use during the videoconference. For example, computer system 20 can apply one or more virtual background selection rules corresponding to identification information for the user 12, the third party 14, and/or one or more other attributes of the videoconference, such as a subject matter of the videoconference to select a set of virtual backgrounds appropriate for use during the videoconference. Computer system 20 can perform the selection in response to receiving the conferencing data 42 for a videoconference and/or a predetermined amount of time before the start of the videoconference (e.g., five minutes, in response to the user 12 signing on to the videoconference, and/or the like). When a videoconference will include three or more participants, computer system 20 can apply the set of virtual background selection rules for each user 12/third party 14 combination. For example, if a videoconference will include a single user 12, and two third parties 14, computer system 20 can select distinct virtual backgrounds to be used in displaying the user 12 to each of the third parties 14.

After selecting a virtual background to be utilized for a third party 14, computer system 20 can provide the virtual background for review by the user 12 before it is utilized during the videoconference. In this manner, the user 12 is aware of the virtual background that will be utilized during the video conference, and will have an opportunity to prevent an undesired virtual background from being used. The user 12 can approve of the virtual background or select from a set of other possible virtual backgrounds pre-approved for use in the videoconference. When multiple virtual backgrounds are appropriate according to the set of virtual background selection rules, computer system 20 can enable the user 12 to manually select a desired virtual background from a list of appropriate virtual backgrounds.

Figure 2:
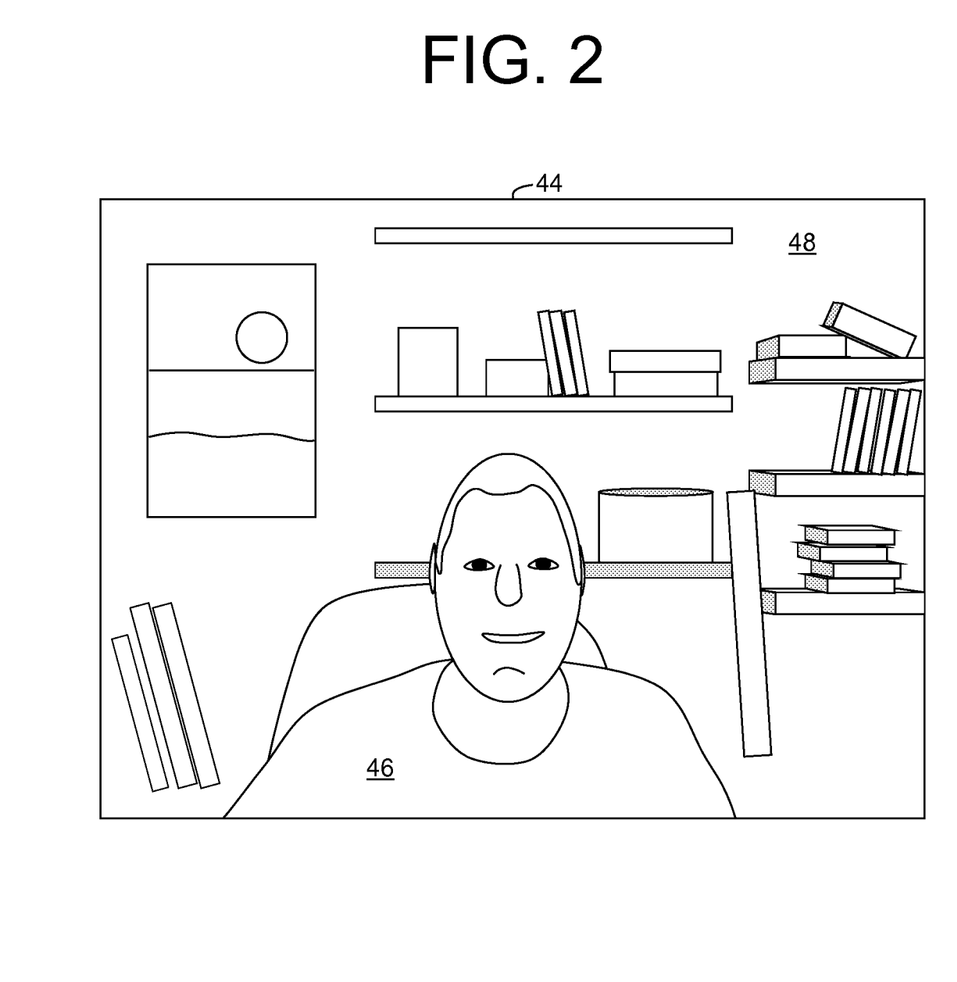
FIG. 2 shows illustrative image data captured by a video camera for a participant of a videoconference.

During the videoconference, a video of an individual is recorded at a corresponding user system 12. FIG. 2 shows illustrative image data 44 captured by a video camera located at a user system 12 for a participant of a videoconference. As illustrated, the image data 44 includes participant image data 46 corresponding to the user 12 as well as background image data 48 corresponding to the background located behind the user 12. In this case, the background image data 48 shows an unorganized work area. To this extent, the background can be distracting to third parties 14 during the videoconference. Additionally, the business entity for which the user 12 works, may not want customers or prospective customers to have an adverse impression of the business entity and/or the user 12 based on the background. Additionally, the background image data 48 could include content that is confidential and could be damaging to the business entity if it is viewed by an external third party 14.

In any event, the image data 44 can be processed to isolate the participant image data 46 from the background image data 48 using any solution. In an embodiment, the user system 12 includes isolation software, which is configured to identify and isolate the participant image data 46 in a video stream from the background image data 48. In an alternative embodiment, the user system 12 can provide video data including all of the image data 44 for processing by the computer system 20, which in turn isolates the participant image data 46 from the background image data 48 using any solution.

Figure 3:
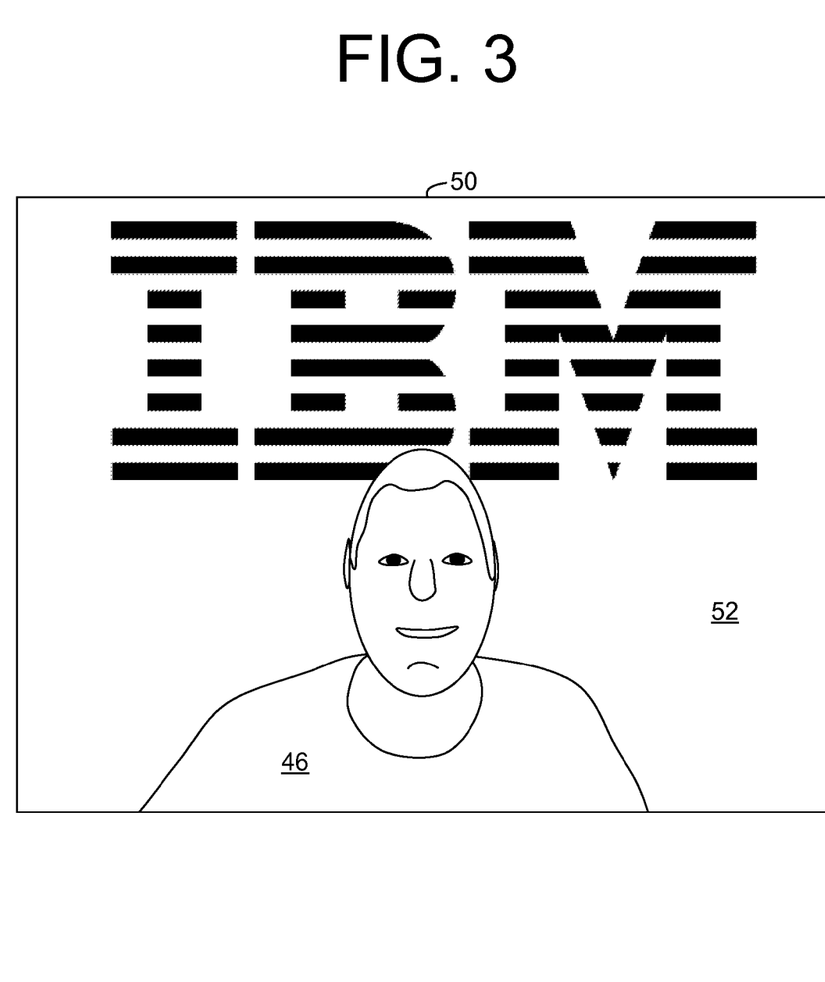
FIG. 3 shows illustrative user video image data including isolated user image data and a virtual background according to an embodiment.
Figure 4:
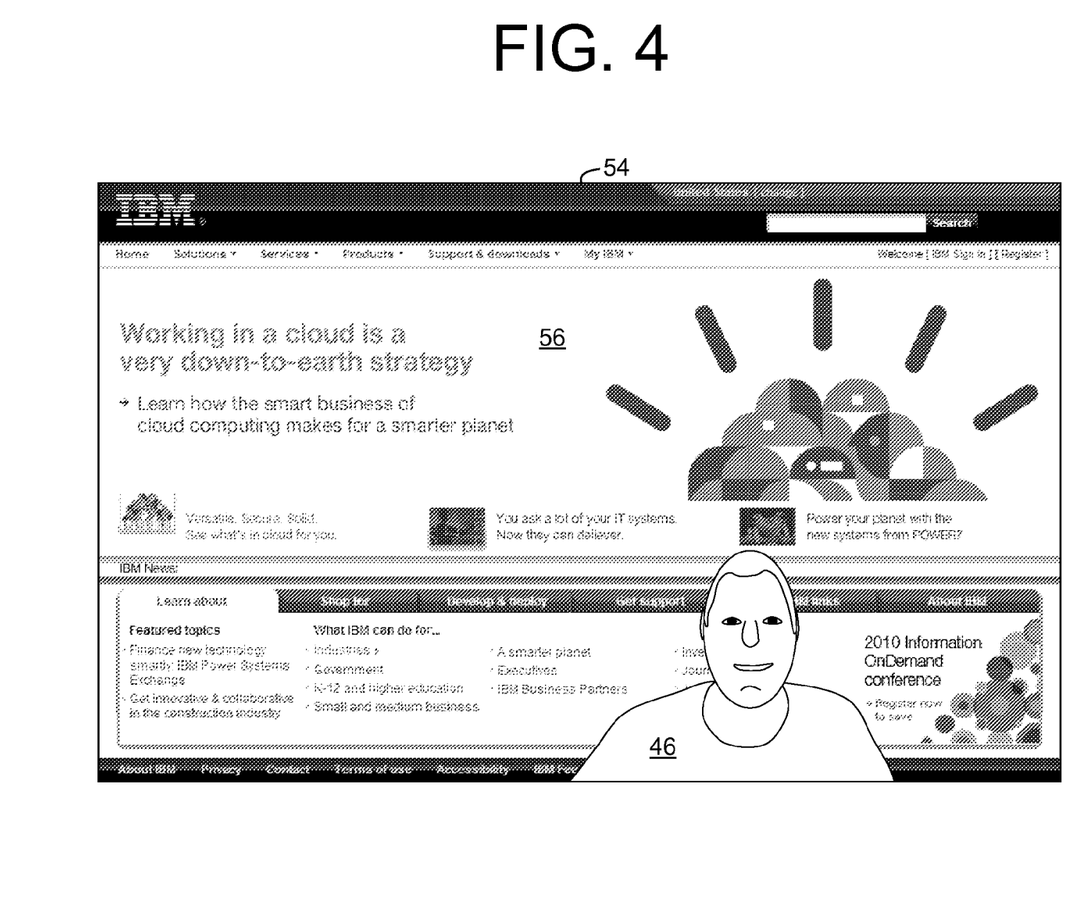
FIG. 4 shows illustrative user video image data including isolated user image data and a virtual background according to another embodiment.

Subsequently, the isolated participant video data is merged with a virtual background for presentation to a third party 14 using any solution. As described herein, any of various computing devices, such as user system 12, computer system 20, third party system 14, and/or the like, can merge the isolated participant video data with the virtual background during the videoconference. The virtual background can communicate a desired perception and/or message that the business entity wants to project to individuals outside of the business entity. For example, FIG. 3 shows illustrative user video image data 50 including isolated user image data 46 and a virtual background 52 according to an embodiment. In this case, the originally captured background image data 48 (FIG. 2) has been replaced by a virtual background 52, which includes a corporate logo. Alternatively, the virtual background can communicate a message relevant to a topic of discussion during the videoconference. For example, FIG. 4 shows illustrative user video image data 54 including isolated user image data 46 and a virtual background 56 according to another embodiment. In this case, the originally captured background image data 48 has been replaced by a virtual background 56, which includes a web page.

In an embodiment illustrated by FIGS. 2 and 3, the merging includes substitution of the captured background image data 48 with the virtual background image data 52 without adjusting any attributes of the isolated user image data 46. In this case, the location, relative size, etc., of the user image data 46 remains the same for the captured image data 44 and the presented image data 50. In an alternative embodiment illustrated by FIGS. 2 and 4, the merging can include adjusting one or more aspects of the isolated user image data 46. For example, one or more of the size, location, and/or the like, of the user image data 46 can be altered to locate the user image data 46 in a desired area of the presented image data 54. The adjustment can be performed, for example, in order to locate the user image data 46 in an area of the virtual background 56 that is not relevant to the desired messaging (e.g., a topic of discussion of the videoconference) being conveyed using the virtual background 56. In an embodiment, computer system 20 can manage background data 40 (FIG. 1), which identifies a target area for placement of the user image data 46 over a virtual background 56. In this case, the merging can include relocating and/or adjusting the size of the user image data 46 so that it remains within the identified target area.

It is understood that while use of a single virtual background during a videoconference has been described herein, multiple virtual backgrounds can be utilized during a videoconference. In particular, a virtual background used for a user 12 can be alternated between a plurality of virtual backgrounds during the videoconference. The current virtual background can be changed according to a predetermined time period (e.g., every five minutes), in response to a request from the user 12, and/or the like. For example, when multiple virtual backgrounds are appropriate for a particular third party 14, computer system 20 can periodically change a currently used virtual background of the multiple virtual backgrounds, rather than select a single virtual background. Similarly, when a virtual background is utilized that is relevant to a topic of discussion, the user 12 can selectively change the virtual background as a new area of discussion is started (e.g., a different web page, a different screenshot of an application, and/or the like).

Figure 5A:
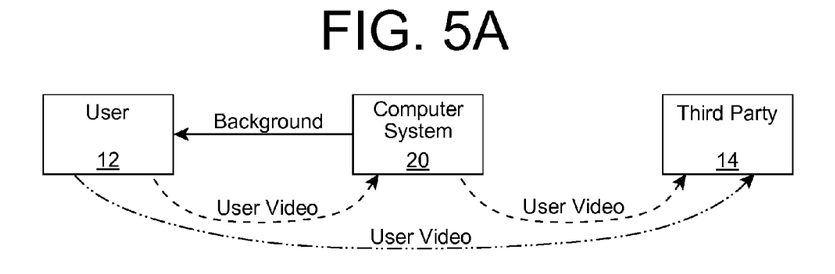
FIGS. 5A-5C show alternative solutions for generating the merged image data for presentation to a third party participant according to embodiments.
Figure 5B:
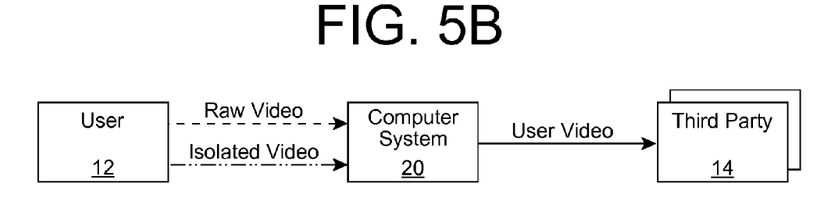
Figure 5C:
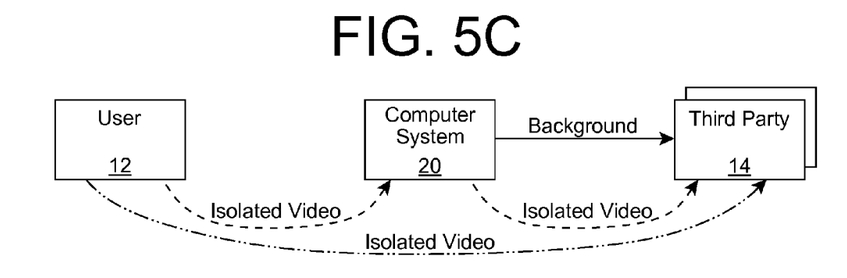

Regardless, FIGS. 5A-5C show alternative solutions for generating the merged image data for presentation to the third party 14 according to embodiments. In FIG. 5A, computer system 20 provides the virtual background for processing on the user system 12. It is understood that computer system 20 can provide the virtual background for processing on another system using any solution. To this extent, the computer system 20 can provide one or more image files corresponding to the virtual background, data enabling the user system 12 to access image data corresponding to the virtual background, and/or the like. In the latter case, the data can comprise an IP address for a video source, a web page, a file address, and/or the like, which the user system 12 can access to obtain the image data for the virtual background.

In any event, in FIG. 5A, the user system 12 can combine the isolated video data for the user with the image data for the virtual background to generate the video data for the user (user video) for display on the third party system 14. Subsequently, the user system 12 can transmit the user video to an intermediary system, such as computer system 20, which is managing the videoconference, which in turn forwards the user video for processing by the third party system 14. Alternatively, the user system 12 can transmit the user video for processing by the third party system 14, without the use of an intermediary system managing the videoconference.

The embodiment of FIG. 5A can provide one or more benefits. For example, the user system 12 can perform substantially all of the processing locally, thereby not increasing the complexity of communicating and generating the user video for display on the third party system 14 outside of the additional processing performed on the user system 12. Additionally, the embodiment of FIG. 5A can be beneficial when only a single third party system 14 is participating in the videoconference or each of a plurality of third party systems 14 will be utilizing the same virtual background.

In another embodiment shown in FIG. 5B, the user system 12 transmits either the raw video data captured at the user system 12 and/or the isolated video data corresponding to just the user located at the user system 12 for processing by computer system 20. In the former case, computer system 20 can isolate the participant image data 46 from the background image data 48 using any solution. Additionally, computer system 20 can combine the isolated video data for the user with the image data for the virtual background to generate the video data for the user (user video) for display on the third party system 14. Computer system 20 can provide the user video for display on the third party system 14.

The embodiment of FIG. 5B can provide one or more benefits. For example, the amount of processing and/or bandwidth required for user system 12 can be reduced as compared to that required in FIG. 5A. Additionally, computer system 20 can generate multiple different user videos for the user when multiple third party systems 14 are participating in the videoconference and utilizing different virtual backgrounds. Still further, when the virtual background comprises a video feed, the computer system 20 can comprise a server or the like, which can comprise more communications bandwidth and/or processing capability to generate the user video.

In another embodiment shown in FIG. 5C, the computer system 20 provides the virtual background for processing on the third party system(s) 14. During the videoconference, the user system 12 generates the isolated video image data and transmits the isolated video for processing on the third party system(s) 14. The user system 12 can transmit the isolated video to an intermediary system, such as computer system 20, which is managing the videoconference, which in turn forwards the isolated video for processing by a third party system 14. Alternatively, the user system 12 can transmit the isolated video for processing by a third party system 14, without the use of an intermediary system managing the videoconference. Subsequently, the third party system(s) 14 generate the user video by combining the isolated video with the virtual background image data and display the user video to the corresponding third party participant.

The embodiment of FIG. 5C can provide one or more benefits. For example, the amount of communications bandwidth required to implement the videoconference can be reduced since the user video is not transmitted between any systems. Additionally, the processing required to generate multiple distinct user videos, each of which requires a distinct virtual background, can be spread out among the respective third party systems 14.

As described herein, aspects of the invention enable the management of various virtual backgrounds to selectively project an image or other content relevant to a business entity to third party participants of a videoconference. Additionally, it is understood that aspects of the invention can enable the management of various virtual backgrounds to selectively project content regarding a third party 14 to user(s) 12 (e.g., personnel of the business entity) of a videoconference. For example, the virtual background can indicate a relationship of the third party to the business entity (e.g., potential customer, current customer, and/or the like), one or more attributes of the relationship (e.g., internal contact individual, type of relationship, and/or the like), etc.

While shown and described herein as a method and system for managing a videoconference, it is understood that aspects of the invention further provide various alternative embodiments. For example, in one embodiment, the invention provides a computer program fixed in at least one computer-readable medium, which when executed, enables a computer system to manage a videoconference. To this extent, the computer-readable medium includes program code, such as conferencing program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as conferencing program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing a videoconference. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing a videoconference, the method comprising:

configuring display of a first videoconference participant to a second videoconference participant of the videoconference using a computer system, the configuring including:

the computer system automatically selecting a first virtual background for the first videoconference participant from a plurality of virtual backgrounds based on attribute data corresponding to: a first videoconference participant identification and a second videoconference participant identification, wherein the automatically selecting includes applying a set of virtual background selection rules to the attribute data corresponding to: the first videoconference participant identification and the second videoconference participant identification, wherein the first videoconference participant works for a business entity and the plurality of virtual backgrounds have been pre-approved by the business entity for use in conjunction with videoconferences; and providing the first virtual background from the computer system for display to the second videoconference participant in conjunction with isolated video data corresponding to the first videoconference participant isolated from an actual background of the first videoconference participant during the videoconference.

2. The method of claim 1, wherein the second videoconference participant does not work for the business entity and wherein the set of virtual background selection rules correspond to a desired perception for the business entity associated with the second videoconference participant.

3. The method of claim 1, further comprising configuring a second display of the first videoconference participant to a third videoconference participant of the videoconference using the computer system, the configuring the second display including:

automatically selecting a second virtual background for the first videoconference participant from the plurality of virtual backgrounds based on attribute data corresponding to a third videoconference participant identification and a second set of virtual background selection rules corresponding to the third videoconference participant using the computer system; and providing the second virtual background from the computer system for display to the third videoconference participant in conjunction with the isolated video data corresponding to the first videoconference participant during the videoconference.

4. The method of claim 1, further comprising providing the isolated video data corresponding to the first videoconference participant isolated from the actual background from the computer system for display to the second videoconference participant in conjunction with the first virtual background during the videoconference.

5. The method of claim 4, wherein the providing the first virtual background and the providing the isolated video data are performed during the videoconference, the method further comprising combining the first virtual background and the isolated video data on the computer system.

6. The method of claim 1, wherein the first virtual background is provided to a computing device corresponding to the second videoconference participant prior to the videoconference, the method further comprising providing the isolated video data for display to the second videoconference participant during the videoconference.

7. The method of claim 1, wherein the first virtual background is provided to a computing device corresponding to the first videoconference participant prior to the videoconference, the method further comprising providing the combined isolated video data and the virtual background for display to the second videoconference participant during the videoconference.

8. A computer system comprising:
a set of computing devices configured to manage a video conference by performing a method comprising configuring display of a first videoconference participant to a second videoconference participant of the videoconference, the configuring including:

automatically selecting a first virtual background for the first videoconference participant from a plurality of virtual backgrounds based on attribute data corresponding to: a first videoconference participant identification and a second videoconference participant identification, wherein the automatically selecting includes applying a set of virtual background selection rules to the attribute data corresponding to: the first videoconference participant identification and the second videoconference participant identification, wherein the first videoconference participant works for a business entity and the plurality of virtual backgrounds have been pre-approved by the business entity for use in conjunction with videoconferences; and providing the first virtual background for display to the second videoconference participant in conjunction with isolated video data corresponding to the first videoconference participant isolated from an actual background of the first videoconference participant during the videoconference.

9. The system of claim 8, the method further comprising configuring a second display of the first videoconference participant to a third videoconference participant of the videoconference, the configuring the second display including:

automatically selecting a second virtual background for the first videoconference participant from the plurality of virtual backgrounds based on attribute data corresponding to a third videoconference participant identification and a second set of virtual background selection rules corresponding to the third videoconference participant using the computer system; and providing the second virtual background from the computer system for display to the third videoconference participant in conjunction with the isolated video data corresponding to the first videoconference participant during the videoconference.

10. The system of claim 8, the method further comprising providing the isolated video data corresponding to the first videoconference participant isolated from the actual background for display to the second videoconference participant in conjunction with the first virtual background during the videoconference.

11. The system of claim 10, wherein the providing the first virtual background and the providing the isolated video data are performed during the videoconference, the method further comprising combining the first virtual background and the isolated video data.

12. The system of claim 8, wherein the first virtual background is provided to a computing device corresponding to the second videoconference participant prior to the videoconference, the method further comprising providing the isolated video data for display to the second videoconference participant during the videoconference.

13. The system of claim 8, wherein the first virtual background is provided to a computing device corresponding to the first videoconference participant prior to the videoconference, the method further comprising providing the combined isolated video data and the virtual background for display to the second videoconference participant during the videoconference.

14. A computer program comprising program code embodied in at least one non-transitory computer-readable medium, which when executed, enables a computer system to implement a method of managing a videoconference, the method comprising:
  configuring display of a first videoconference participant to a second videoconference participant of the videoconference by performing a method comprising:
    automatically selecting a first virtual background for the first videoconference participant from a plurality of virtual backgrounds based on attribute data corresponding to: a first videoconference participant identification and a second videoconference participant identification,
    wherein the automatically selecting includes applying a set of virtual background selection rules to the attribute data corresponding to: the first videoconference participant identification and the second videoconference participant identification, wherein the first videoconference participant works for a business entity and the plurality of virtual backgrounds have been pre-approved by the business entity for use in conjunction with videoconferences; and
    providing the first virtual background for display to the second videoconference participant in conjunction with isolated video data corresponding to the first videoconference participant isolated from an actual background of the first videoconference participant during the videoconference.

15. The computer program of claim 14, the method further comprising configuring a second display of the first videoconference participant to a third videoconference participant of the videoconference, the configuring the second display including:
  automatically selecting a second virtual background for the first videoconference participant from the plurality of virtual backgrounds based on attribute data corresponding to a third videoconference participant identification and a second set of virtual background selection rules corresponding to the third videoconference participant using the computer system; and
  providing the second virtual background from the computer system for display to the third videoconference participant in conjunction with the isolated video data corresponding to the first videoconference participant during the videoconference.

16. The computer program of claim 14, the method further comprising providing the isolated video data corresponding to the first videoconference participant isolated from the actual background for display to the second videoconference participant in conjunction with the first virtual background during the videoconference.

17. The computer program of claim 16, wherein the providing the first virtual background and the providing the isolated video data are performed during the videoconference, the method further comprising combining the first virtual background and the isolated video data.

18. The computer program of claim 14, wherein the first virtual background is provided to a computing device corresponding to the second videoconference participant prior to the videoconference, the method further comprising providing the isolated video data for display to the second videoconference participant during the videoconference.

19. The computer program of claim 14, wherein the first virtual background is provided to a computing device corresponding to the first videoconference participant prior to the videoconference, the method further comprising providing the combined isolated video data and the virtual background for display to the second videoconference participant during the videoconference.

20. A method of generating a computer system, the method comprising:
  providing a computer system configured to manage a videoconference by performing a method comprising configuring display of a first videoconference participant to a second videoconference participant of the videoconference, the configuring including:
    automatically selecting a first virtual background for the first videoconference participant from a plurality of virtual backgrounds based on attribute data corresponding to: a first videoconference participant identification and a second videoconference participant identification,
    wherein the automatically selecting includes applying a set of virtual background selection rules to the attribute data corresponding: the first videoconference participant identification and the second videoconference participant identification, wherein the first videoconference participant works for a business entity and the plurality of virtual backgrounds have been pre-approved by the business entity for use in conjunction with videoconferences; and
    providing the first virtual background for display to the second videoconference participant in conjunction with isolated video data corresponding to the first videoconference participant isolated from an actual background of the first videoconference participant during the videoconference.

* * * * *

UNITED STATES PATENT AND TRADEMARK OFFICE
CERTIFICATE OF CORRECTION

PATENT NO. : 8,823,739 B2  
APPLICATION NO. : 12/868109  
DATED : September 2, 2014  
INVENTOR(S) : Rudolph C. Baron, Jr. et al.

Page 1 of 1

It is certified that error appears in the above-identified patent and that said Letters Patent is hereby corrected as shown below:

On the Title Page, Item (75) Inventors:

Delete:
"Rudolf C. Baron, Jr."

Insert:
-- Rudolph C. Baron, Jr. --

Signed and Sealed this
Twenty-ninth Day of September, 2015

Michelle K. Lee
*Director of the United States Patent and Trademark Office*